Jan. 14, 1958 L. M. GHEMAR ET AL 2,820,137
PROCESSES AND APPARATUS FOR COATING WITH MAGNETIC
POWDER A METAL WIRE WHICH SERVES
AS AN ARC-WELDING ELECTRODE
Filed Dec. 20, 1955 2 Sheets-Sheet 1
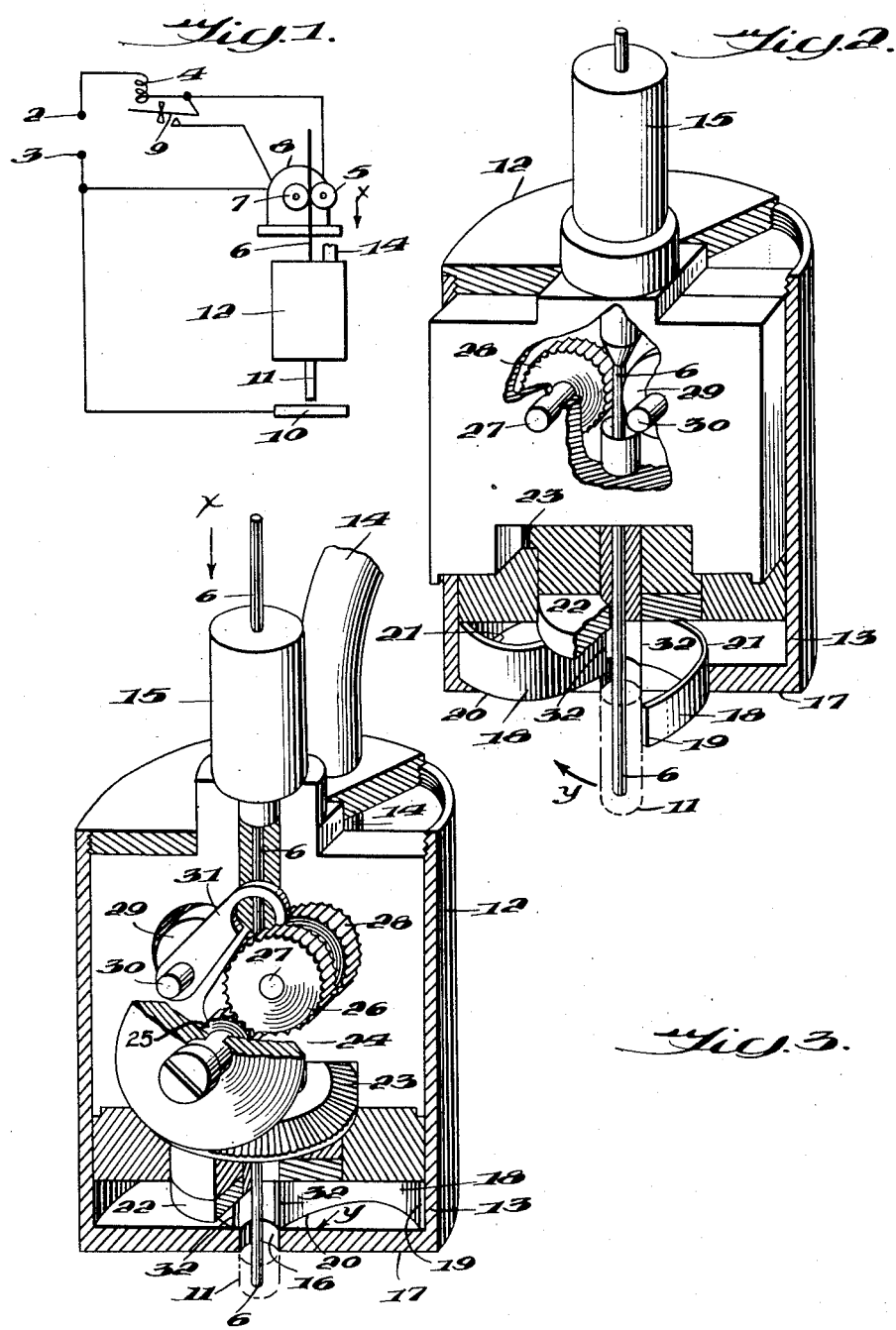

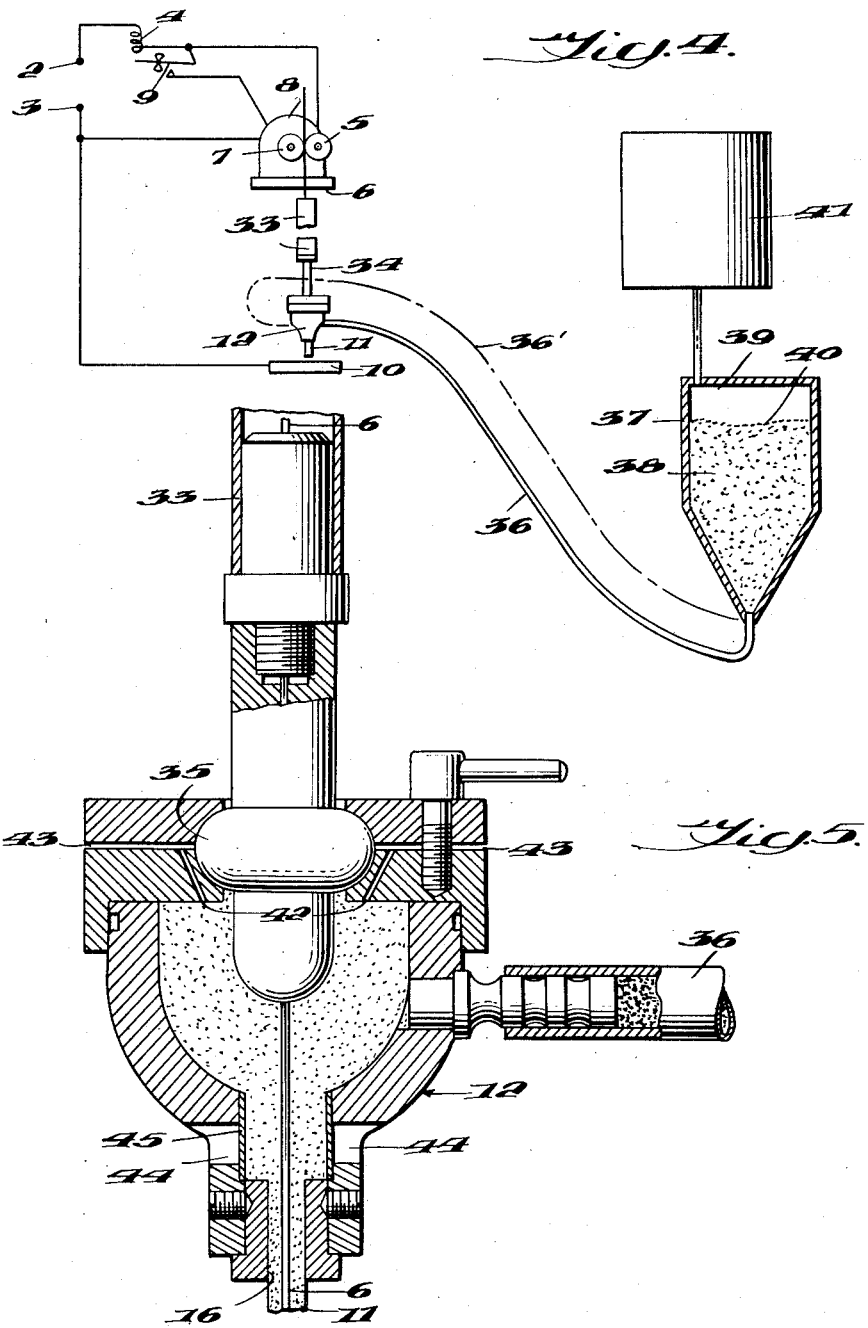

2,820,137
Patented Jan. 14, 1958

2,820,137

PROCESSES AND APPARATUS FOR COATING WITH MAGNETIC POWDER A METAL WIRE WHICH SERVES AS AN ARC-WELDING ELECTRODE

Louis Marcel Ghemar, Ixelles-Brussels, Belgium, and Rene Jacques Ferdinand Daniel Robert Mouton, Lausanne, Switzerland, assignors to Aktiengesellschaft Brown, Boveri & Cie, Baden, Switzerland, a joint-stock company Application December 20, 1955, Serial No. 554,356

Claims priority, application Luxembourg December 30, 1954

8 Claims. (Cl. 219—137)

The present invention relates to processes and apparatus for coating with magnetic powder a metal wire which serves as the electrode in an arc welding process, through the use of a machine for automatically advancing the electrode in the extent of its fusion in the arc, in which process the wire carrying the welding current passes through the magnetic powder in contact with a wall presenting a gauging orifice for the layer of powder drawn by the wire through the said orifice under the combined action of the magnetic field created by the passage of the welding current and the resistance to friction between the wire and the powder attracted to it.

It had been proposed to pass a continuous metal wire, serving as an electrode in an automatic arc-welding machine, into a tank with a truncated-cone bottom containing the magnetic powder; that this tank be put in communication with a tuyere in the axis of which the wire passes, and by which the wire is guided; and that the maximum section of powder drawn away by the wire be limited by making this latter pass through the outlet orifice of said tuyere. In order to facilitate the powder's passage through this latter orifice, it had been suggested at the same time to provide the tuyere with vibrations or transverse shocks.

With this previously proposed process one cannot obtain a coating layer of powder whose external surface is as smooth as the coating layer of an electrode with extruded paste coating; the surface presents a variable diameter which is always smaller than the interior diameter of the tuyere at the latter's outlet. There results from this a loss of powder, which also makes observation of the fusion bath difficult.

Furthermore, when the powder being used is highly magnetic, i. e., when it contains more than 50% iron, it is difficult to adapt the intensity of the shocks to a value suitable to the variable density (compactness) of the powder caused by variations in the welding current. In addition, the necessary intensity of shocks under these conditions requires a considerable expenditure of energy and is highly unsuitable for usage of the electrode when the coating appliance is held by hand by a welder, as is sometimes indispensable.

Finally, using the previously proposed process, it is difficult to produce a coated electrode whose diameter is greater than twice the diameter of the wire constituting the core, especially when the powder is highly magnetic.

The present invention has as its object a process which avoids the aforesaid disadvantages.

For this purpose, we submit the magnetic powder to mechanical thrust toward the aforesaid gauging orifice. In other words, we exert upon the powder which is to be drawn away by the wire a continuous force which adds its action to the action provoked by the aforesaid magnetic field and resistance to the wire's advance in the powder so as to push this latter into a gauging orifice, which cannot be compared to shocks on the wall of a gauging orifice coaxial to the wire, applied perpendicularly to the axis of this latter so as to partially loosen the layer of powder from the said wall.

We preferably thrust the powder toward the wire in parallel to the wall in which the said orifice is situated, and we prevent the powder from escaping in a direction other than that which conducts to the said orifice.

The invention also has as its object the provision of a suitable apparatus for executing the present process, said apparatus including, in familiar manner, a container which holds the magnetic powder, and a wire which issues from it through an orifice limiting the maximum diameter of the layer of powder attracted to the wire by the magnetic field created by the passage of welding current and drawn away by the said wire as a result of the resistance to friction of this latter in the powder.

According to one apparatus embodiment, the powder is moved toward the wire by blades which turn around their axis while being in contact with the wall in which the aforesaid orifice is situated, which blades are oriented in such a way as to advance the powder toward the wire.

Preferably, the extremity, of the aforesaid blades, which is farthest from the wire is at a distance from this latter at which the aforesaid magnetic field has almost no effect on the powder. In addition, this latter is brought by gravity between the said blades close to the said extremity. It results from this that the powder has no tendency to mass together under the action of the aforesaid magnetic field before falling between the blades which thrust it toward the wire. The feed of powder is thus always regular.

According to an advantageous execution mode of the invention, the extremity of the aforesaid blades which is closest to the wire is at a distance from the axis of the latter equal to the radius of the gauging orifice. In this way the blades serve at the same time as a rotary scraper for the layer of powder which surrounds the wire and which is to pass with the latter outside the aforesaid container. The scraping of the powder massed together around the wire at a distance from the axis of this latter equal to the radius of the gauging orifice prevents the ring of powder drawn away by the wire from striking against the edge of the gauging orifice.

In order to simplify the apparatus, the motor action of the blades is derived from the wire in motion, and for this purpose the blades are mounted on a member which is rotated by a mechanical connection controlled by the advance of the wire. This feature assures, furthermore, automation of the advance of the wire and of the advance of the powder toward the wire.

According to an alternative embodiment of the present invention, we press the powder pneumatically towards the wire in a coating box, until the wire is in the part of the magnetic field created by the welding current where the magnetic attraction exerted on the powder towards the wire will suffice to move the powder towards the wire to the extent that there is room to accommodate it.

Experiments have shown that it would be sufficient to exert a relatively light gas pressure on the powder to have it advance regularly towards the wire during the passage of welding current.

In order to prevent a pocket of the gas under pressure being formed accidentally in the powder from blowing it through the gauging, or calibration, orifice, we also provide for letting the pressure escape out of the box at a distance from the wire which is greater than the radius of the calibration orifice.

Preferably we let the pressure escape from the box close to the wire but from the side opposed to that in which the calibration orifice is located. In an advantageous variation, we exert the gas pressure on the powder in a reservoir containing this powder and communicating with the above box by at least one pipe. Operating in this way we can, if we want to guide the electrode manually during the welding operation, move it very easily because the weight and volume of the pieces to be moved are small.

Additional features and details of the invention will arise in the course of describing the appended drawings, which drawings represent schematically, and purely as examples, embodiments of apparatus in accordance with the present invention.

In the drawings:

Figure 1 represents, in a purely schematic manner, an installation for arc-welding with the aid of a device characterized by the automatic advance of the electrode and by a coating appliance for this latter in conformity with an embodiment according to the invention;

Figure 2 represents, in perspective and according to an axial section, partially cut away, a model of an apparatus embodying the invention;

Figure 3 shows the same appliance, in section and partially cut away, seen from the opposite side from that of Figure 2;

Figure 4 is a diagrammatic representation of an installation for electric arc-welding by means of a machine automatically feeding the electrode, comprising a device for coating the latter, suitable for carrying out the aforesaid alternative embodiment of the process according to the invention; and Figure 5 is, in axial section and on a larger scale, a part of the installation according to Figure 4.

In these various figures the same reference notations signify the identical elements.

In Figure 1 we have represented schematically an installation connected to a source (not shown) of electric current by terminals 2 and 3. Terminal 2 is connected, through a relay 4, to a roller 5 which is part of the automatic welding machine. This roller draws, in the direction of arrow $x$, a wire 6 coming from a bobbin (not shown), the said wire being run between roller 5 and another, cooperating, roller 7. The rotation of roller 5 is effectuated with the aid of a motor 8 fed with current under the control of a switch 9 which is brought to its closed position when the coil of relay 4 is traversed by a current. The passage of current in the said coil takes place when an arc bursts between a piece 10 being welded and an electrode 11 constituted by the wire 6 which has been coated with magnetic powder in an apparatus of the invention designated by 12.

The said apparatus comprises a container 13 to the bottom of which magnetic powder is brought by gravity, being guided in a pipe 14. The wire 6 enters the said container through a guide member 15 and leaves it through an orifice 16 situated in the wall 17 constituting the bottom of container 13. This orifice serves to gauge the layer of magnetic powder which is drawn by the wire 6 from the container as a result of the resistance to friction of the wire in the powder which is attracted to the said wire by the magnetic field created by the passage of welding current.

The powder carried by the pipe 14 falls on the bottom 17 close to the periphery of this latter at a distance from the wire's axis where the aforesaid magnetic field has almost no effect on the powder. It results from this that the powder can fall freely without massing together under the influence of the magnetic field.

The powder leaving the pipe 14 falls between a number of blades 18 close to those extremities 19 which are farthest from the wire. These blades are, in the specific embodiment shown in the drawing three in number, at 120° from each other. The lower edge 20 of each of these blades is in contact with the bottom wall 17. Their upper edge 21 is partially affixed, e. g., by welding, to a disc 22 which itself is secured onto a conical gear wheel 23 coaxial to the wire 6. Gear wheel 23 is engaged with another conic wheel 24 keyed onto the same shaft as a pinion 25. This latter is engaged with a gear wheel 26 keyed onto a shaft 27 on which there is also keyed a wheel 28 against which the wire 6 is pressed by a roller 29. The shaft 30 of roller 29 is biased toward shaft 27 by means of springs of which one is represented at 31 in Figure 3.

It is to be understood that the advance of the wire 6 in the direction of arrow $x$ provokes the rotation of the blades 18 in the direction of arrow $y$. These blades are oriented in such a way that their rotation direction causes the powder falling between them to advance toward the axis of wire 6. They exercise a continual mechanical thrust on the powder toward the gauging orifice 16, it being provided that the powder situated between them cannot escape in any direction other than the one which leads them to said orifice.

The closest extremity 32 of the blades 18 to the wire 6 is at a distance from the axis of the latter equal, or substantially equal, to the radius of the gauging orifice 16. These extremities thus serve as a "scraper" for the layer of agglomerated material which tends to be drawn into the gauging orifice in the course of the wire's advance. Their distance from the wire's axis could also be slightly greater than said radius.

The bottom wall 17, in contact with which the blades 18 turn, is perpendicular to the axis of the said wire. It results from this that the height of powder on which we must thrust the material toward the gauging orifice 16 is reduced to the height of the blades 18.

If this wall were in truncated cone shape, the height of powder highly agglomerated around the wire 6 and on which we would be exercising thrust toward the gauging orifice 16 in order to facilitate the evacuation of the powder coating would be higher. It is of advantage that in the case of a truncated-cone bottom the angle between the wire's axis and the intersection of this bottom by an axial plane be greater than 45°.

In the alternative embodiment illustrated in Figures 4 and 5, the container or box 12 is connected to a fixed part, for example the base of the motor 8, by a flexible sheath 33 in which the wire 6 is guided. This sheath is fixed at its other end to a tube 34 (Fig. 4) which is adjustable in orientation with respect to box 12 by means of a knee joint 35.

The magnetic powder to constitute the coating of the electrode is brought into box 12 through pipe 36 (Fig. 4) which is also in communication with a reservoir 37 containing a reserve supply of powder 38. This latter is put under pressure in this reservoir by the fact that it is surmounted by an atmosphere of air under pressure 39, the pressure exerted on the upper face 40 of the mass of powder being furnished, for example, by a supply of compressed air from a vessel 41.

We have noted in the course of our experiments that even when the reservoir 37 is at a level slightly below that of box 12, a pressure of between 0.5 and 1 kilo per square centimeter is sufficient to move the powder into the space where the magnetic field, provoked by the passage of welding current in the wire, is sufficient to agglomerate this powder around the wire and bring it with the latter through the calibration orifice 16. This space extends for several centimeters from the axis of the wire.

If the powder in reservoir 40 is at a level above that of box 12, the pressure exerted on the powder in the box is augmented by the weight of the column of powder, and bringing it into the box is only improved therewith.

The compressed air which serves to force the powder into the box 12, which may be imprisoned therein, can escape from this box at a distance from the axis of the wire greater than the radius of the calibration orifice 16. Preferably, we allow this air escape at a point close to the wire but in the side of box 12 opposite to that in which the calibration orifice is located. This escape can take place, for example, through vents 42 located near the knee joint 35 and in communication with relief channels 43.

Side windows 44, covered by a wire mesh cloth 45, are also provided in box 12, in the vicinity of the calibration orifice 16, to allow escape of the residual air which may be imprisoned in the powder already agglomerated by the magnetic field.

The aforesaid pipe 36 communicates with the interior of box 12 through the side wall of the latter. We can, if desired, also connect this box to reservoir 41 by several flexible tubes.

In Figure 4 we have sketched, in dotted lines 36', a second pipe of this type which opens into the box 12 at a point diametrically opposed to that where pipe 36 opens.

It readily will be seen that the radial pressure to be exerted on the powder towards the axis of the wire to destroy the arch of agglomerated powder, with generatrices parallel to the wire, which tends to form around the latter need not be as great as that if this pressure was directed parallel to this axis. This explains why the lateral delivery of the powder under pressure is preferable to an axial delivery.

It will be evident that the invention is not limited to specific embodiments represented and that many modifications might be applied in the shape, arrangement and constitution of certain elements used in its production, on the condition that these modifications are not in contradiction to the object of the following claims.

We claim:

1. A process for coating with discrete magnetic powder a metal wire which serves as an electrode in arc-welding processes through the use of a machine for automatically advancing the electrode in the extent of its fusion in the arc, in which process the wire carrying the welding current passes into the magnetic powder in contact with a wall presenting a gauging orifice for the layer of powder drawn by the wire through this orifice under the combined action of the magnetic field created by the passage of welding current and by the resistance to friction between the wire and the powder attracted toward it, characterized in that the discrete magnetic powder is continuously mechanically thrust toward said gauging orifice and into a magnetic field created by the passage of welding current through the wire.

2. A process for coating with discrete magnetic powder a metal wire which serves as an electrode in arc-welding processes through the use of a machine for automatically advancing the electrode in the extent of its fusion in the arc, in which process the wire carrying the welding current passes into the magnetic powder in contact with a wall presenting a gauging orifice for the layer of powder drawn by the wire through this orifice under the combined action of the magnetic field created by the passage of welding current and by the resistance to friction between the wire and the powder attracted toward it, characterized in that the discrete magnetic powder is continuously forced by a gas under pressure into a confined space surrounding the wire and into the magnetic field created by welding current where the magnetic attraction exerted on the powder towards the wire is sufficient to move the powder toward the wire to the extent that there is room to accommodate it and in that gas under pressure is emitted from said confined space to atmosphere at a distance remote from the axis of the wire greater than the radius of said gauging orifice.

3. A process for coating with magnetic powder a metal wire which serves as an electrode in arc-welding processes through the use of a machine for automatically advancing the electrode in the extent of its fusion in the arc, in which process the wire carrying the welding current passes into the magnetic powder in contact with a wall presenting a gauging orifice for the layer of powder drawn by the wire through this orifice under the combined action of the magnetic field created by the passage of welding current and by the resistance to friction between the wire and the powder attracted toward it, characterized in that the magnetic powder is forced by air under pressure into a confined space surrounding the wire and into the magnetic field created by welding current where the magnetic attraction exerted on the powder towards the wire is sufficient to move the powder toward the wire to the extent that there is room to accommodate it and in that air under pressure is emitted from said confined space at a distance remote from the axis of the wire greater than the radius of said gauging orifice.

4. a process for coating with magnetic powder a metal wire which serves as an electrode in arc-welding processes through the use of a machine for automatically advancing the electrode in the extent of its fusion in the arc, in which process the wire carrying the welding current passes into the magnetic powder in contact with a wall presenting a gauging orifice for the layer of powder drawn by the wire through this orifice under the combined action of the magnetic field created by the passage of welding current and by the resistance to friction between the wire and the powder attracted toward it, characterized in that the magnetic powder is moved by a current of air under pressure into a confined space surrounding the wire and into the magnetic field created by welding current where the magnetic attraction exerted on the powder towards the wire is sufficient to move the powder toward the wire to the extent there is room to accommodate it, and in that air under pressure is emitted from said confined space at a locus remote from said gauging orifice.

5. Apparatus for coating with discrete magnetic powder a metal wire serving as an electrode in an arc welding machine wherein the electrode is automatically advanced as it melts in the arc, which comprises, in combination, a container adapted to hold the magnetic powder, a gauging orifice in one wall of said container, means for advancing the wire into and through said container and gauging orifice, means for introducing discrete magnetic powder into said container, and means for positively moving magnetic powder, contained in said container, into proximity to said wire and into a magnetic field created by the passage of welding current through the wire.

6. Apparatus for coating with magnetic powder a metal wire serving as an electrode in an arc welding machine wherein the electrode is automatically advanced as it melts in the arc, which comprises, in combination, a container adapted to hold the magnetic powder, a gauging orifice in one wall of said container, means for advancing the wire into and through said container and gauging orifice, means for introducing magnetic powder into said container, and means for positively moving magnetic powder, contained in said container, into proximity to said wire said powder-moving means including pneumatic means for forcing magnetic powder toward said fire and into a magnetic field created by passage of electric current through said wire and gas-venting relief means in said container at a locus remote from the center of the gauging orifice by a distance greater than is the radius of said orifice.

7. Apparatus for coating with magnetic powder a metal wire serving as an electrode in an arc welding machine wherein the electrode is automatically advanced as it melts in the arc, which comprises, in combination, a container adapted to hold the magnetic powder, a gauging orifice in one wall of said container, means for advancing the wire into and through said container and gauging orifice, means for introducing magnetic powder into said container, means for positively moving magnetic powder, contained in said container, into proximity to said wire said powder-moving means including pneumatic means for forcing magnetic powder, contained in said container, toward said wire and into a magnetic field created by passage of electric current through said wire, and gas pressure relief means provided in said container at a locus remote from said orifice.

8. The apparatus defined in claim 5, in which said powder-moving means includes a reservoir for magnetic powder, at least one conduit communicating between the bottom of said reservoir and said container, and pneumatic means for forcing magnetic powder from said reservoir through said conduit and into said container.

References Cited in the file of this patent

UNITED STATES PATENTS

| | | |
|---|---|---|
| 1,347,184 | Smith | July 29, 1920 |
| 2,198,085 | Tourneau et al. | Apr. 23, 1940 |
| 2,210,786 | Wasmund | Aug. 6, 1940 |
| 2,450,457 | Grotenhuis | Oct. 5, 1948 |

FOREIGN PATENTS

| | | |
|---|---|---|
| 608,270 | Great Britain | Sept. 13, 1948 |

OTHER REFERENCES

"Industry and Weld Monthly," February 1954, pp. 66–68.